2,790,706
NON-CAKING FLUOSILICATE COMPOSITION

Frank W. Panepinto, Philadelphia, Pa., assignor to The Pennsylvania Salt Manufacturing Company, Philadelphia, Pa., a corporation of Pennsylvania No Drawing. Application October 6, 1955,
Serial No. 539,032

2 Claims. (Cl. 23—88)

This invention relates to a novel and improved zinc fluosilicate characterized by its non-caking qualities and to a method of commercially producing said non-caking zinc fluosilicate.

The principal object of the invention is to provide a zinc fluosilicate which will not cake or harden while being subjected to the various climatic changes in humidity and temperature encountered during storage or shipment.

A further object is to provide a zinc fluosilicate product to which has been added a small amount of hydrated inorganic salt which maintains the product in a non-caked form. A further object is to provide a process for adding the anti-caking agent during the commercial manufacturing of the zinc fluosilicate in order that a separate manufacturing operation is not required for the addition agent.

Other objects and advantages of the invention will be apparent from a consideration of the specification and the claims.

Zinc fluosilicate hexahydrate is a very deliquescent crystalline material which forms a hard caked mass when exposed to varying conditions of humidity and temperature. The degree of caking is dependent on the extent of the exposure to the changing humidity conditions. In this hard caked condition, the zinc fluosilicate cannot be readily removed from the shipping container or storage bin and is thereby rendered difficult to use. Similarly, hard caked zinc fluosilicate is not suitable for blending with other materials as is required in certain of its uses. In either case, the product is not saleable and requires expensive reprocessing before it is suitable for use. Moreover, the usual deliquescent zinc fluosilicate requires an expensive moisture-proof container for shipping purposes if caking is to be avoided. However, even this is no assurance that the product will be non-caked when ready to use since moisture may be included at the time of packaging.

It has now been discovered that zinc fluosilicate hexahydrate in particulate form may be maintained in a non-caked condition by the addition of small amounts of magnesium chloride hexahydrate, also in particulate form. This was not to be expected because of the various inorganic additives tested, only magnesium chloride hexahydrate was effective. The mode of operation of the magnesium hexahydrate in maintaining the zinc fluosilicate in a non-caked form is not fully understood. One possible theory is that the magnesium chloride hexahydrate maintains the deliquescent zinc fluosilicate in a fully hydrated condition with the result that hardening and caking of the zinc fluosilicate is avoided.

The particle size of the added magnesium chloride is not critical. It is sufficient that the particle size of the magnesium chloride be of the order of that of the commercial zinc fluosilicate being treated, thereby avoiding substantial segregation or settling out of the added material.

The amount of magnesium chloride hexahydrate to be added to the commercial granular zinc fluosilicate, in order to render it non-caking, can be varied from about 2% to about 10% by weight. Below about 2% by weight of magnesium chloride, the zinc fluosilicate will tend to cake if exposed to extreme humidity conditions. Above about 10% by weight of magnesium chloride hexahydrate, the zinc fluosilicate hexahydrate tends to become excessively moist and undesirable. The preferred range of magnesium chloride hexahydrate to be added is from about 3 to about 7% by weight.

The magnesium chloride can be advantageously introduced to the zinc fluosilicate wet cake after its granulation at the entrance to the continuous rotary dryer of the zince fluosilicate manufacturing process in the proportions of 5 lbs. of magnesium chloride hexahydrate to 95 lbs. of zinc fluosilicate (dry hexahydrate basis).

The mixing in the rotary dryer effectively blends the two materials. Or, the magnesium chloride can be added to the dried granular fluosilicate and mixed in any conventional commercial blending equipment. Considerable modification of the methods used to incorporate the hydrated magnesium chloride can be made without departing from the invention disclosed.

The incorporation of hydrated magnesium chloride with commercial zinc fluosilicate in the manner and amounts as above described results in mixtures which do not cake when subjected alternatively to conditions of zero humidity and saturated humidity. Inexpensive containers can be used in transporting the treated fluosilicate and other manufacturing savings are effected by elimination of reprocessing steps formerly necessary for handling untreated zinc fluosilicate.

I claim:

1. A zinc fluosilicate hexahydrate salt characterized by its non-caking properties comprising said salt in particulate form and from about 2% to about 10% by weight of magnesium chloride hexahydrate in intimate admixture therewith.

2. A zinc fluosilicate hexahydrate salt characterized by its non-caking properties comprising said salt in particulate form and from about 3% to about 7% by weight of magnesium chloride hexahydrate.

References Cited in the file of this patent

UNITED STATES PATENTS 2,299,999   Lippman _____ Oct. 27, 1942

OTHER REFERENCES

McPherson and Henderson book on "General Chemistry," 3rd ed., 1927, page 514. Ginn and Co., N. Y.